(12) United States Patent
Zhai et al.

(10) Patent No.: US 11,195,013 B2
(45) Date of Patent: Dec. 7, 2021

(54) DANET-BASED DRONE PATROL AND INSPECTION SYSTEM FOR COASTLINE FLOATING GARBAGE

(71) Applicant: Wuyi University, Jiangmen (CN)

(72) Inventors: Yikui Zhai, Jiangmen (CN); Yihang Zhi, Jiangmen (CN); Qirui Ke, Jiangmen (CN); Cuilin Yu, Jiangmen (CN); Wenlve Zhou, Jiangmen (CN); Zilu Ying, Jiangmen (CN); Junying Gan, Jiangmen (CN); Junying Zeng, Jiangmen (CN); Yanyang Liang, Jiangmen (CN); Chaoyun Mai, Jiangmen (CN); Chuanbo Qin, Jiangmen (CN); Ying Xu, Jiangmen (CN)

(73) Assignee: Wuyi University, Jiangmen (CN)

( * ) Notice: Subject to any disclaimer, the term of this patent is extended or adjusted under 35 U.S.C. 154(b) by 0 days.

(21) Appl. No.: 16/995,239

(22) Filed: Aug. 17, 2020

(65) Prior Publication Data
US 2021/0224512 A1    Jul. 22, 2021

(30) Foreign Application Priority Data

Jan. 17, 2020    (CN) .......................... 202010050817.5

(51) Int. Cl.
*G06K 9/00* (2006.01)
*G05D 1/10* (2006.01)
*G05D 1/00* (2006.01)
*G06K 9/46* (2006.01)
*G06K 9/62* (2006.01)
*H04N 5/232* (2006.01)

(52) U.S. Cl.
CPC ......... *G06K 9/0063* (2013.01); *G05D 1/0094* (2013.01); *G05D 1/106* (2019.05); *G06K 9/4604* (2013.01); *G06K 9/4652* (2013.01); *G06K 9/4671* (2013.01); *G06K 9/6232* (2013.01); *H04N 5/23238* (2013.01)

(58) Field of Classification Search
CPC .............. B64C 2201/12; B64C 39/024; B64C 2201/027; B64C 2201/127
See application file for complete search history.

(56) References Cited

U.S. PATENT DOCUMENTS

2016/0306824 A1* 10/2016 Lopez .................. G06T 3/4092
2017/0320570 A1* 11/2017 Horn ...................... B64D 47/08

* cited by examiner

*Primary Examiner* — Clifford Hilaire
(74) *Attorney, Agent, or Firm* — Vivacqua Crane, PLLC

(57) ABSTRACT

A double attention network (DANet)-based drone patrol and inspection system for coastline floating garbage, including: an image acquisition module configured to shoot a video of a coastline in need of patrol and inspection by using a drone, and obtain an image from the video; a feature extraction module configured to extract shallow features and deep features, fuse the shallow features and the deep features to obtain a shared feature, and finally output a panoramic recognition result; a network training module configured to perform training on the labeled image so that the network can recognize the coastline and floating garbage; and a path correction module configured to adjust a flying direction of the drone.

10 Claims, 6 Drawing Sheets

DANET-BASED DRONE PATROL AND INSPECTION SYSTEM FOR COASTLINE FLOATING GARBAGE

CROSS-REFERENCE TO RELATED APPLICATIONS

This application is based on and claims the benefit of priority from Chinese Patent Application No. 202010050817.5, filed on 17 Jan. 2020, the entirety of which is incorporated by reference herein.

TECHNICAL FIELD

The present disclosure relates to the technical field of patrol and inspection systems, and in particular, to a double attention network (DANet)-based drone patrol and inspection system for coastline floating garbage.

BACKGROUND

As a marine littering problem becomes more and more serious, pollutants are very likely to enter human body with sea creatures, making it particularly important to reduce marine litter. As the ocean is huge, most of litter cleared nowadays is coastal floating garbage. However, the coastline is very long and has a tortuous edge, making it difficult to plot an accurate coastline, thus failing to obtain an accurate cleaning path. As the coastline is long and tortuous, it is unrealistic to clean along the entire coastline. Instead, it is necessary to know where the garbage is for selective cleaning. In addition, it is difficult for people to access some parts of the coastline, which affects the efficiency of manual detection of floating garbage. Conventional patrol and inspection methods include manual patrol and on-site monitoring. The manual patrol generally involves only patrol and inspection of flat land, since it is difficult for people to inspect cliffs, rocky shores, and the like. The manual patrol consumes a lot of manpower and material resources due to a long patrol and inspection cycle and visual range limitation. The on-site monitoring requires high arrangement costs, and cannot cover the entire basin. Moreover, a shooting range of a monitoring device is limited and a miss easily occurs during inspection. Surveillance videos require manual analysis, which further increases labor and financial costs. In addition, the effect of manual analysis varies from person to person, and an analysis result is unreliable. In general, problems of the existing technologies are: low efficiency of manual patrol and inspection and high costs of monitoring and detection. To resolve the problems, in recent years, an automatic drone patrol and inspection solution has emerged. The solution is used for river patrol and inspection, according to which a drone is equipped with a camera to shoot river videos and pollutants are manually found in the videos. The solution is characterized by automatic patrol and inspection of the drone, which detects a coast through dynamic binarization, and automatically adjusts a flying direction. In this method, although the drone can automatically find a way to fly, observation still requires a lot of labor. Moreover, the dynamic binarization detection method is of low robustness, and actual coastal conditions are changeable, which easily affect the algorithm accuracy and cause the drone to deviate from the ideal route.

SUMMARY

To resolve at least one of the technical problems in related arts, the present disclosure is directed to provide a DANet-based drone patrol and inspection system for coastline floating garbage, which has advantages of improving the intelligence of patrol and inspection and optimizing a drone route, and can achieve objectives of low cost and high efficiency.

A DANet-based drone patrol and inspection system for coastal floating garbage according to an embodiment of the present disclosure includes:

an image acquisition module configured to shoot a video of a coastline in need of patrol and inspection by using a drone, and obtain an image from the video;

a feature extraction module configured to extract shallow features and deep features by inputting the image to an FPN network, fuse the shallow features and the deep features to obtain a shared feature, input the shared feature to each of a region proposal network (RPN) branch, a foreground branch, and a background branch, and finally output a panoramic recognition result;

a network training module configured to label the image and add the labeled image to a data set for pre-training so that a network learns edge features and color features, modify a classifier according to a coastline patrol and inspection requirement, and perform training on the labeled image so that the network can recognize the coastline and floating garbage; and a path correction module configured to adjust a flying direction of the drone for the drone to fly forward along a direction extending tangentially to and forming a direction angle from the coastline, wherein, calculate a mean of all coastline coordinates as a flying starting point of the drone, sort and fit points where the coastline meets land to form a continuous curve, and calculate a tangent direction of a point on the curve, to update the flying direction angle.

The DANet-based drone patrol and inspection system for coastal floating garbage according to this embodiment of the present disclosure achieves at least the following technical effects. The system obtains background and foreground target objects in the image through segmentation by using a panoramic segmentation algorithm, and assigns an independent identity to each foreground target. A precise segmentation result can be obtained to help the drone adjust flying direction to automatically plan a flying path. Simultaneously, coastal floating garbage is detected, and a location and a class of garbage are fed back once a pollutant is found, to help a relevant department resolve a pollutant patrol and inspection problem in the scenario of a long coastline. The system has advantages of improving the intelligence of patrol and inspection and optimizing a drone route, and can achieve objectives of low cost and high efficiency.

According to some embodiments of the present disclosure, the image acquisition module obtains five frames of images per second from the video, and an image resolution is 1920*1080.

According to some embodiments of the present disclosure, when the shared feature is input to the RPN branch, each region proposal with a probability to be a target in the image is calculated based on the shared feature via the RPN, the region proposals are input to a fully connected layer one by one, an output class is calculated using a softmax function, and location coordinates of the target in the image are calculated through regional regression.

According to some embodiments of the present disclosure, when the shared feature is input to the foreground branch for segmentation to obtain a foreground target, a region of interest alignment (ROIAlign) algorithm is applied on shared feature so that bilinear interpolation is first performed on a plurality of region proposals, and then pooling is performed to obtain 14×14 and 7×7 feature maps, wherein the 14×14 feature map is input to a mask generation network which is formed by connecting a residual network ResNet50 to two fully connected layers, to output a feature map with a mask and obtain a foreground target mask; and the 7×7 feature map is input to a classification and positioning network which is formed by connecting two connection layers to a regression algorithm and a softmax algorithm to obtain and output a class of the foreground target and location coordinates of the foreground target in the image.

According to some embodiments of the present disclosure, when the shared feature is input to the background branch for segmentation to obtain background of the image, a region proposal attention module and a mask attention module are used, the region proposal attention module is first used for the shared feature and an RPN, corresponding elements are multiplied for the feature, and are then added to original feature elements, and the mask attention module fuses a foreground feature map and a background feature map, and optimizes a background feature by using foreground information.

According to some embodiments of the present disclosure, the network training module labels the coastline image by using strong and weak labels, and performs pre-training by using coco2014 and coco2015 data sets so that the network learns the edge features and the color features. The network parameters are used for further training, in a process of performing training by using the data sets, a pre-trained classifier is discarded first, a network structure and parameter of a previous hidden layer are retained, for different class quantities, the classifier needs to be modified according to the coastline patrol and inspection requirement, so that a quantity of output classes is the same as that of classes that actually need to be detected, the parameter is randomly initialized after the output of the classifier is modified, and then the labeled coastline image is used for training, so that the trained network can recognize the coastline and floating garbage.

According to some embodiments of the present disclosure, an image instance segmentation algorithm and a flying direction algorithm are built in the drone. The image instance segmentation algorithm recognizes a seawater region, obtains all x and y axis coordinates of the seawater in an image, and stores the coordinates in a two-dimensional array. Coordinates with a minimum x axis coordinate for each y axis coordinate are selected as coastline coordinates, a mean of all coastline coordinates are calculated as the flying starting point of the drone, the flying direction angle is updated according to the flying direction algorithm, and the drone rotates to adjust to a proper angle.

According to some embodiments of the present disclosure, the drone uses all the coastline coordinates [$\{P_{1x}, P_{1y}\}$, $\{P_{2x}, P_{2y}\}, \ldots \{P_{nx}, P_{ny}\}$] as inputs. T$_h$e coordinates are sort by sums of squares of pixel coordinates x and y, and a Euclidean distance is calculated between two points and then sort the calculated distance, so that a group P of adjacent and continuous coastline coordinates are obtained. Fit coordinate points of P to obtain the curve, and obtains an offset angle α by using the following formula:

$$\alpha = 90° - \text{Arctan}(k)$$

where k is a slope of the tangent line of a midpoint of the curve, and is used to adjust the flying direction of the drone.

According to some embodiments of the present disclosure, the system further includes a terminal control module configured to remotely control the drone, where the terminal control module includes an information display unit, a drone management unit, and an information management unit.

The present disclosure further provides a DANet-based drone patrol and inspection method for coastline floating garbage, including:

shooting a video of a coastline in need of patrol and inspection by using a drone, and obtaining an image from the video;

extracting shallow features and deep features by inputting the image to an FPN network, integrating the shallow features and the deep features to obtain a shared feature, inputting the shared feature to each of an RPN branch, a foreground branch, and a background branch, and finally output a panoramic recognition result;

labeling the image and adding the labeled image to a data set for pre-training so that a network learns edge features and color features, modifying a classifier according to a coastline patrol and inspection requirement, and training the labeled image so that the network can recognize the coastline and floating garbage; and adjusting a flying direction of the drone for the drone to fly forward along a direction extending tangentially to and forming a direction angle from the coastline, calculating a mean of all coastline coordinates as a flying starting point of the drone, sort and fit points where the coastline meets land to form a continuous curve, and calculate a tangent direction of a point on the curve, to update the flying direction angle.

Additional aspects and advantages of the present disclosure are set forth in the following descriptions, some of which will become obvious from the following descriptions, or be learned through practice of the present disclosure.

BRIEF DESCRIPTION OF THE DRAWINGS

The above and/or additional aspects and advantages will become obvious and be easily understood from the following description of the embodiments with reference to the accompanying drawings, in which.

DETAILED DESCRIPTION

To make the objectives, technical solutions, and advantages of the present disclosure clearer and more comprehensible, the following further describes the present disclosure in detail with reference to the accompanying drawings and embodiments. It should be understood that the described specific embodiments are used only to explain the present disclosure rather than to limit the present disclosure.

It should be noted that, if there is no conflict, features in the embodiments of the present disclosure may be combined with each other, and all such combinations fall within the protection scope of the present disclosure. In addition, although the schematic diagram of the system shows functional module division and a logical sequence is shown in the flowchart, in some cases, different module division than that in the system may be performed, or the shown or described steps may be performed in a sequence different from that shown in the flowchart.

The following further describes the embodiments of the present disclosure with reference to the accompanying drawings.

Figure 1:
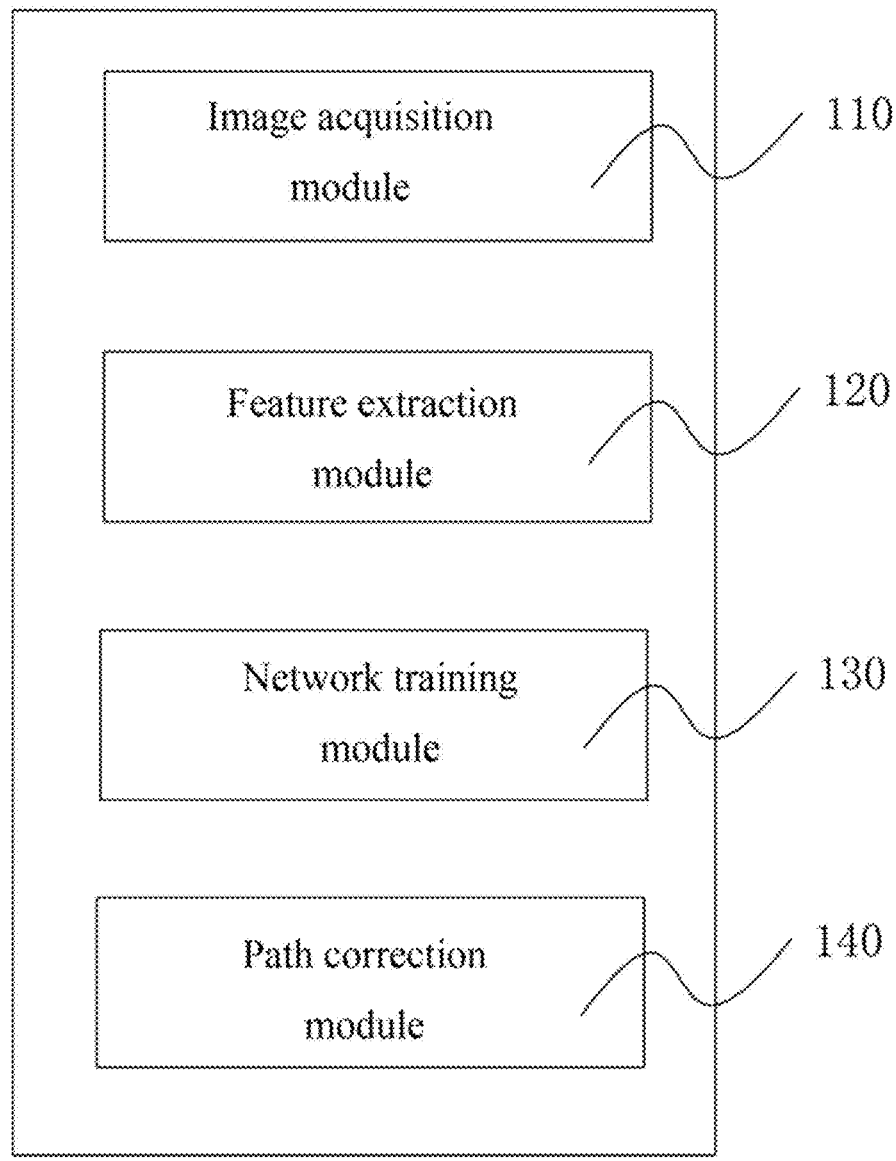
FIG. 1 is a diagram of a DANet-based drone patrol and inspection system for coastal floating garbage according to a first embodiment of the present disclosure.

As shown in FIG. 1, a first embodiment of the present disclosure provides a DANet-based drone patrol and inspection system for coastal floating garbage, including:

an image acquisition module 110 configured to shoot a video of a coastline requiring patrol and inspection by using a drone, and obtain an image from the video;

a feature extraction module 120 configured to extract shallow features and deep features by inputting the image to an FPN network, fuse the shallow features and the deep features to obtain a shared feature, input the shared feature to each of an RPN branch, a foreground branch, and a background branch, and finally output a panoramic recognition result;

a network training module 130 configured to label the image and add the labeled image to a data set for pre-training so that a network learns edge features and color features, modify a classifier according to a coastline patrol and inspection requirement, and perform training on the labeled image so that the network can recognize the coastline and floating garbage; and a path correction module 140 configured to adjust a flying direction of the drone for the drone to fly forward along a direction extending tangentially to and forming a direction angle from the coastline, wherein, calculate a mean of all coastline coordinates as a flying start point of the drone, sort and fit points where the coastline meets land to form a continuous curve, and calculate a tangent direction of a point on the curve, to update the flying direction angle.

Specifically, the drone records the coastline video with a video resolution of 1920*1080 by using an onboard camera, height at which the drone flies is maintained between 10 to 15 meters to obtain a clear shooting vision. The video is processed by a built-in panoramic segmentation algorithm of the drone, to detect the coastline and floating garbage. A shore width is calculated. The drone adjusts the height, latitude, and longitude according to the path correction module 140 to shoot the video of the river. Recognition results of pollutants such as sewage and floating garbage are displayed on an application in real time, and time, GPS location, and class data is stored in a database for easy reuse. The drone sends a completion signal to the application upon reaching the end, and returns along a shortest path.

The system uses an end-to-end panoramic segmentation framework, which combines instance segmentation and semantic segmentation, and assigns a class label and an instance number to each pixel. Compared with the instance segmentation, the panoramic segmentation not only recognizes a target object, but also recognizes the background. The background is used to optimize a pixel recognition region of the object to further improve the segmentation accuracy. Compared with the semantic segmentation, the panoramic segmentation assigns each target object a different identity number, which is beneficial for target differentiation and positioning in practical application. Attention modules are added to pre-process the input features. Processed feature maps show that significant feature enhancement effects are produced in different target regions.

The image acquisition module 110 acquires five frames of images per second from the video shot by the drone with a resolution of 1920*1080, as network inputs.

Figure 2:
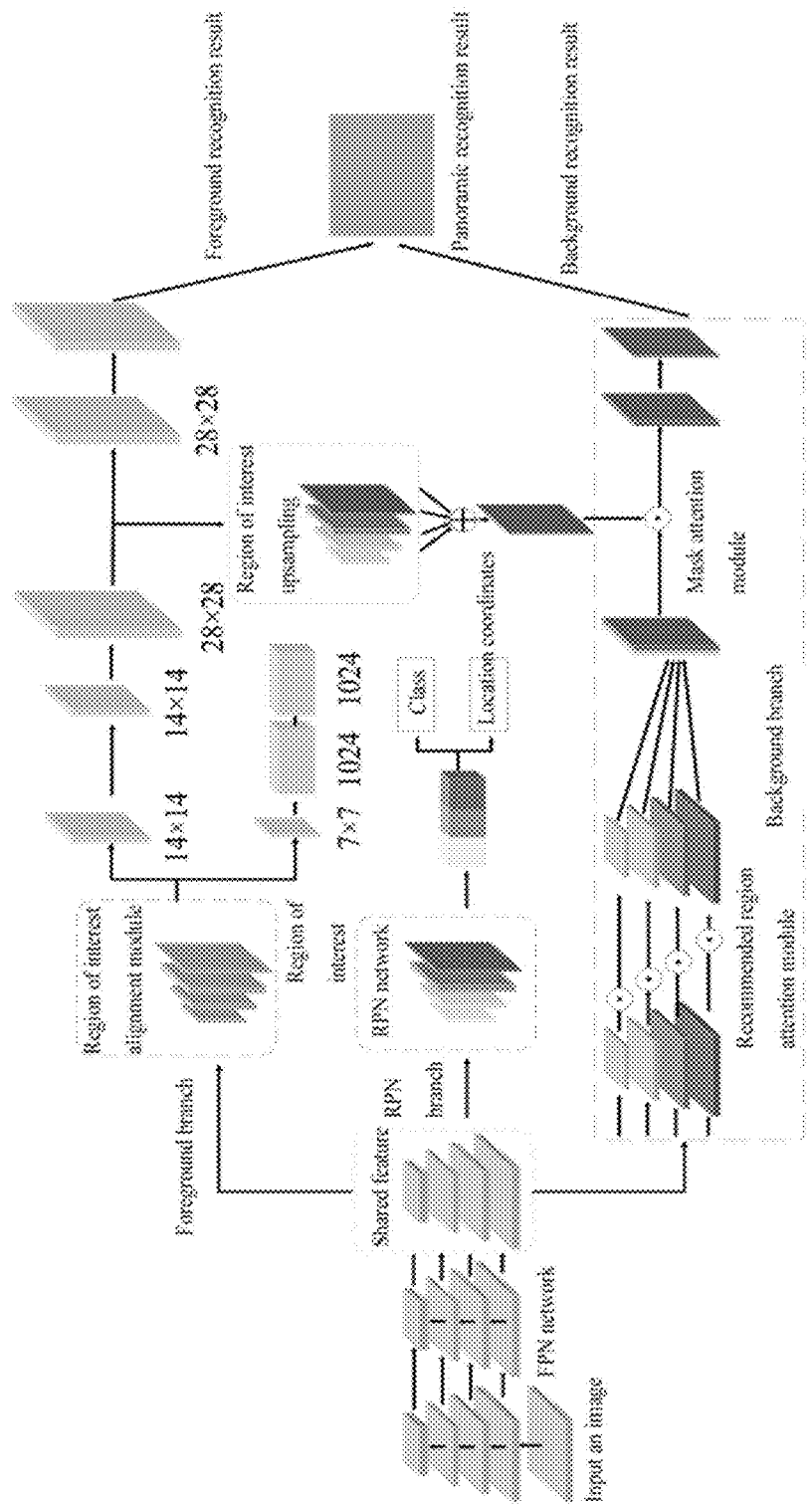
FIG. 2 is a diagram of a feature extraction module according to the first embodiment of the present disclosure.

As shown in FIG. 2, the feature extraction module 120 uses a multi-scale feature extraction network FPN to extract features at different scales, to resolve a problem that different object sizes affect recognition results. The FPN fuses the shallow features and the deep features through convolution calculation, so that both the shallow features and the deep features are used for prediction. Extracted information from two types of features are of different importance. A shallow network has more detailed features, and a deep network has more abstract features. The two types of features can complement each other, to improve a network recognition rate. The final shared feature is obtained after the fusion, and is input to the subsequent three branches: the RPN branch, the foreground branch, and the background branch.

In the RPN branch, each region with a probability to be a target in the image, i.e. a region proposal, is calculated based on the shared feature via the RPN, the region proposals are input to a fully connected layer one by one, a class is output through calculation by using a softmax function, and location coordinates of the target in the image are calculated through regional regression. The RPN is a fast and highly precise detection algorithm that can quickly extract accurate feature maps as inputs to other modules. The features output by the RPN are shared with other branches for use to save time lest that the other branches extract the features separately.

The foreground branch is responsible for segmentation to obtain a foreground target. Firstly, ROI Align algorithm is applied on the shared feature to perform bilinear interpolation on a plurality of region proposals, and then pooling is performed to obtain 14×14 and 7×7 feature maps. Herein, a bilinear interpolation algorithm is carried out before pooling is performed, which retains more useful pixel information than pooling straightforwardly, thereby greatly reducing the loss of features in the pooling process, which is very helpful for small target detection and segmentation. The 14×14 feature map is input to a mask generation network which is formed by connecting a residual network ResNet50 to two fully connected layers and outputs a feature map with a mask, to obtain a foreground target mask. The ResNet50 network is a relatively balanced network with respect to performance and effects. On the premise that the recognition precision does not decrease too much, a performance requirement is not high. The 7×7 feature map is input to a classification and positioning network which is formed by connecting two connection layers to a regression algorithm and a softmax algorithm, to obtain and output a class of the foreground target and location coordinates of the foreground target in the image.

Figure 3:
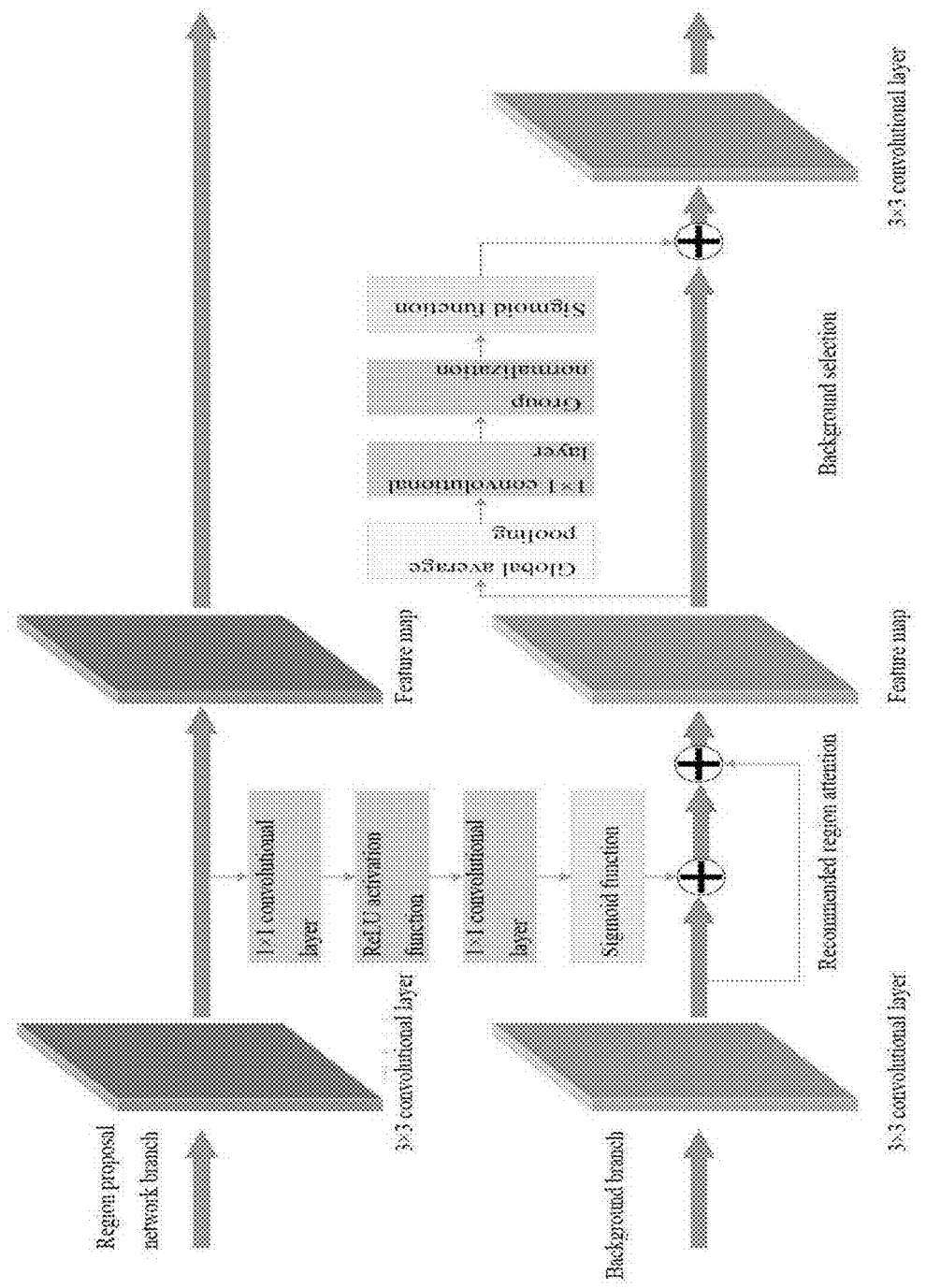
FIG. 3 is a diagram of a region proposal attention module according to the first embodiment of the present disclosure.
Figure 4:
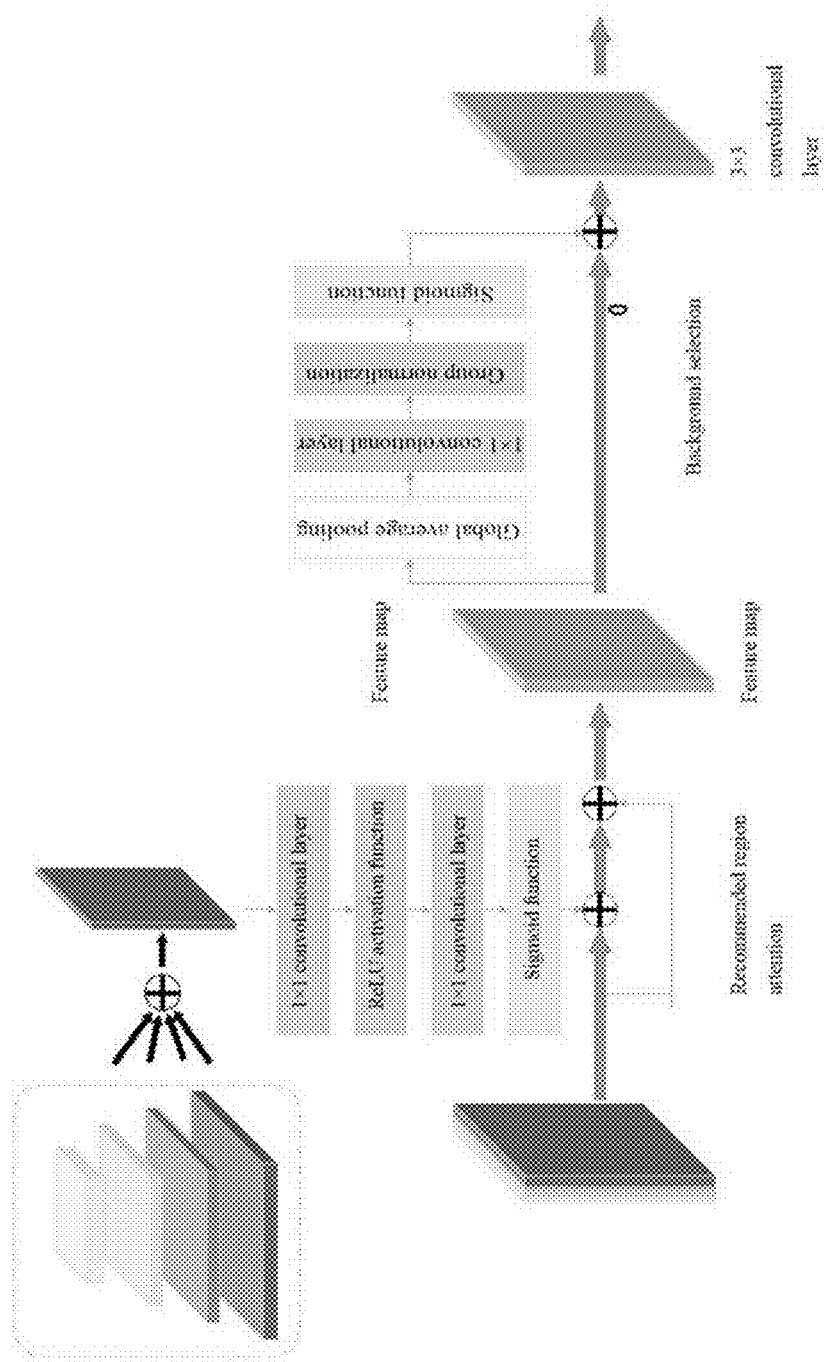
FIG. 4 is a diagram of a mask attention module according to the first embodiment of the present disclosure.

The background branch is responsible for segmentation to obtain the background of the image. In the background segmentation process, two attention modules are used: a region proposal attention module and a mask attention module, to model a remote context and a channel dimension of space, and establish relationships between foreground, background objects and a series of coarse to fine attention blocks during panoramic segmentation. With the attention modules, more useful feature information is extracted. In network implementation, the region proposal attention module is first used for the shared feature and the RPN, and corresponding elements are multiplied for the feature, and then are added to original feature elements. The advantage of such operations is to use the information in the region proposal to add spatial attention and guide the background feature extraction. A process of region proposal attention adding is shown in FIG. 3. ⊕ represents para addition, and ⊗ represents para multiplication. Compared to the network without the attention module, a feature of a target region is more prominent and features of an irrelevant region are reduced after the attention module is added. In this way, less irrelevant features and more target features are extracted, which improves the segmentation precision, and reduces the chance of false detection. The mask attention module is further used after the region proposal attention module, as shown in FIG. 4. The module fuses a foreground feature map and a background feature map, and optimizes a background feature by using foreground information. The foreground feature is first obtained from the mask generation network of the foreground branch, and restored to an original feature map size using upsampling and feature cascading. Then like region proposal attention, corresponding elements are multiplied, and then are added to original feature elements. After attention is added, background selection is performed for group normalization to perform feature calibration, so as to improve the segmentation precision.

After each convolutional layer, a normalized activation module is added, which includes a normalized layer and a ReLU activation function. The normalized layer maps data distribution to [0, 1], which makes a data gradient decline faster and more accurately, speeds up convergence, and reduces a training time. A formula of the ReLU activation function is as follows:

$$ReLU(x) = \begin{cases} x & \text{if } x > 0 \\ 0 & \text{if } x \leq 0 \end{cases}$$

Each region that may have a target is extracted by cropping and becomes a separate region of interest $F_1$, $F_2$, $F_n$, which is input to the classification and positioning module and the mask generation module respectively. The classification and positioning network, formed by connecting two connection layers to a regression algorithm and a softmax algorithm, outputs the class of the target and the location coordinates of the target in the original image. The mask generation network, formed by connecting the residual network ResNet50 to two fully connected layers, outputs a feature map with a mask. In total, a final target classification results, location coordinates, and a mask region are obtained. A loss function of an output result shown below is a sum of loss functions of the three results:

$$L_{final} = L_{class} + L_{box} + L_{mask}$$

$L_{final}$ is a final loss, $L_{class}$ is a class prediction loss, $L_{box}$ is a positioning loss, and $L_{mask}$ is a mask loss.

Through network calculation on the input image, the background, namely, ocean and land and the foreground target, namely, floating garbage are obtained through precise segmentation. Pixels of the ocean are output to a flying direction planning algorithm to adjust a flying attitude and flying direction. The class and GPS location of the floating garbage are stored in the database for reference for a relevant cleaning department.

In order for the network to learn the features of the coastline and floating garbage, the network training module 130 is used to label the coastline image and generate 20000 coastline data sets for training. The labeling process is performed by using strong and weak labels. The total sets are divided into two parts with a ratio of 3:1: a set 1 and a set 2. Each class instance in the set 1 is labeled with a mask annotation, that is, the strong label. A class instance in the set 2 has only a bounding box annotation, that is, the weak label. Since the class in the set 2 has only the weak label on the target object, the model is trained by combining classes with strong and weak labels. For the weak label, an object only needs to be labeled with a rectangular box. The process takes only a few seconds, which is less than one-tenth of the time to make a strong label. This can greatly improve the labeling efficiency and thus increase the quantity of training sets. In addition, as more data is added, the effect of network training is improved.

In addition to a partially supervised learning method, a transfer learning method is also used in the training process. First, coco2014 and coco2015 data sets are used for pre-training, which contain 330K images, 80 object classes, 5 labels for each image, and 250000 key points. The pre-training enables the network to learn edge features and color features, and the network parameters are used for further training. Since a new task also includes similar edge features and color features, the network can converge faster and the recognition rate can also be improved. In a process of performing training by using our own data sets, a pre-trained classifier is discarded first, and a network structure and parameter of a previous hidden layer are retained. Since class quantities could vary, the classifier needs to be modified according to the coastline patrol and inspection requirement, so that a quantity of output classes is the same as the quantity of classes that actually need to be detected. The parameter is randomly initialized after the output of the classifier is modified, and then the 20000 labeled coastline images are used for training, so that the network can recognize the target object on the coastline. The trained network can recognize the coastline and floating garbage.

The path correction module 140 is configured to adjust a flying direction of the drone for the drone to fly forward along a direction extending tangentially to and forming a direction angle from the coastline, wherein, a mean of all coastline coordinates are calculated as a flying starting point of the drone. With the panoramic segmentation algorithm, the background, the coastline, and the land in the image can be detected. Because the background detected by the recognition algorithm is discrete and irregular points, points where the coastline meets land need to be sorted and fitted to obtain a continuous curve before the direction angle is calculated, to calculate a tangent direction of a point on the curve, and update the direction angle.

The drone uses all the coastline coordinates [{$P_{1x}$, $P_{1y}$}, {$P_{2x}$, $P_{2y}$}, ... {$P_{nx}$, $P_{ny}$}] as inputs, the coordinates are sort by the sum of squares of pixel's coordinates x and y, a Euclidean distance is calculated between two points and is then used for sorting, a group P of adjacent and continuous coastline coordinates is obtained, coordinate points of P are fit to obtain the curve, an offset angle α is calculated by using the following formula:

$$\alpha = 90° - \text{Arctan}(k)$$

k is a slope of the tangent line of a midpoint of the curve, and is used to adjust the flying direction of the drone.

To balance the algorithm recognition effect and the flying safety, when shot by the drone, the seawater region should occupy 60% to 80% of the image. Changes in sea level and changes in flow direction during the flying could all affect a image ratio occupied. According to an actual situation, the path correction module 140 is designed with three path correction schemes: a direction angle initialization solution, a width change solution, and a flow direction change solution.

Direction angle initialization solution: The solution aims to resolve the problem of automatic direction angle search at the beginning of patrol and inspection. The drone flies forward by using the coastline extension direction as the direction angle. An initial flying height is set to 20 meters to ensure that both shores of the water can be shot. The instance segmentation algorithm recognizes a seawater region, obtains all x and y axis coordinates of seawater in an image, and stores the coordinates in a two-dimensional array. Coordinates with minimum x axis coordinate for every y axis coordinate are used as coastline coordinates. A mean of all coastline coordinates is calculated as a flying starting point of the drone. The flying direction angle is updated according to the flying direction algorithm above, and the drone rotates to adjust to a proper angle.

Width change solution: A seawater mask area is calculated. If the area is greater than 80% of the image, it means that the flying height of the drone is too low, the drone stops flying forward, slowly rises until the seawater region mask area occupies 70%, and then continues to fly forward. If the area is less than 60% of the image, it means that the flying height of the drone is too high, the drone stops flying forward, slowly descends until the seawater region mask area occupies 70%, and then continues to fly forward.

Flow direction change solution: A water flow direction changes during flying. To realize an automatic path finding function, the built-in instance segmentation algorithm and flying direction algorithm of the drone are used to calculate a flying direction offset angle α in real time. When the flying direction angle has a α offset greater than 30°, the drone rotates. The case that a is less than 30° is ignored. Moreover, to ensure that the seawater is on one side of the image, the drone adjusts a position according to coordinates of a midpoint of the coastline. The midpoint coordinates $(x_m, y_m)$ are averages of all detected coastline points.

To further simplify use of the drone, the system further includes a terminal control module configured to remotely control the drone. The terminal control module includes an information display unit, a drone management unit, and an information management unit. An operator selects a path on an application of the terminal control module to implement the following functions: entering new river data, selecting a river for patrol and inspection, checking a status of the drone in real time, and querying for a patrol and inspection result. The information display unit displays the video shot by the drone in real time to prevent an accident; and displays results of algorithm analysis simultaneously, making it convenient for people to view a detection result. The drone management unit displays a drone battery status, a storage space usage status, positioning information, and direction information. The information management unit has an entry button for entering starting and ending points of a new river; a river selection button for selecting a river for patrol and inspection, where the drone automatically flies to the latitude and longitude of the entered starting point of the river, and then invokes a path self-correction algorithm to start automatic patrol and inspection; a query button for viewing past patrol and inspection results in the database, to find a location and a class of a pollutant, to facilitate a next treatment scheme.

Figure 5:
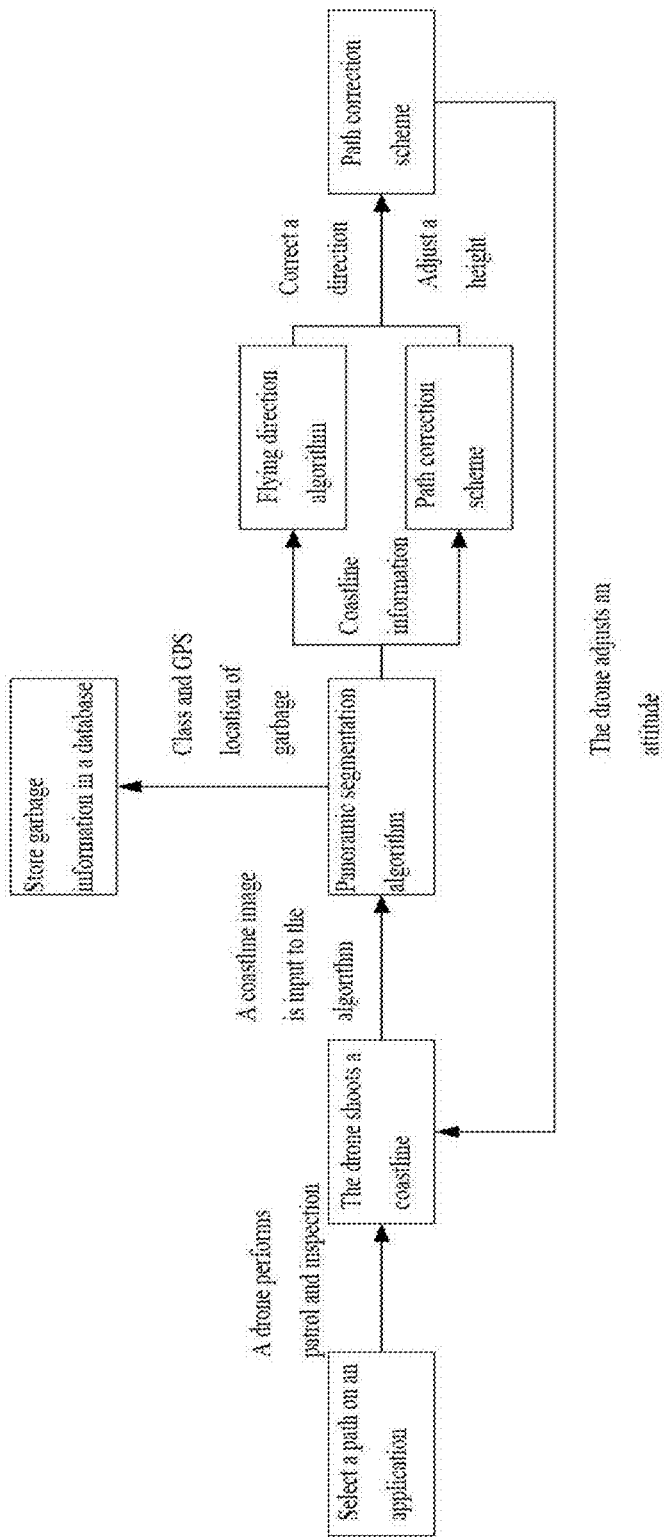
FIG. 5 is a block diagram of an operation process of the system according to the first embodiment of the present disclosure.

Finally, the entire system performs a process as shown in FIG. 5.

Figure 6:
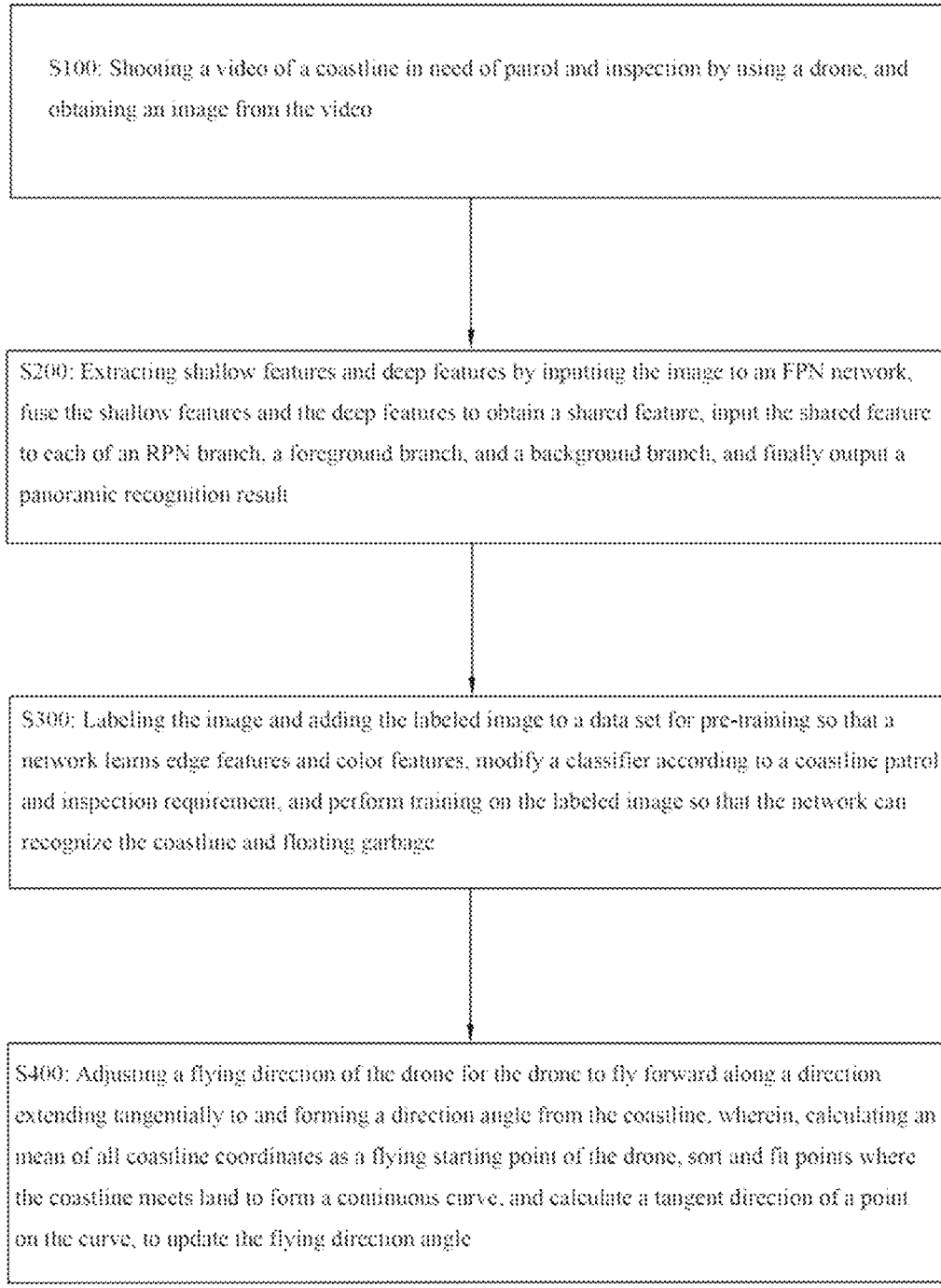
FIG. 6 is a flowchart of a DANet-based drone patrol and inspection method for coastal floating garbage according to a second embodiment of the present disclosure.

As shown in FIG. 6, a second embodiment of the present disclosure provides a DANet-based drone patrol and inspection method for coastline floating garbage, including the following steps:

S100: Shoot a video of a coastline in need for patrol and inspection by using a drone, and obtain an image from the video.

S200: Extract shallow features and deep features by inputting the image to an FPN network, fuse the shallow features and the deep features to obtain a shared feature, input the shared feature to each of an RPN branch, a foreground branch, and a background branch, and finally output a panoramic recognition result.

S300: Label the image and adding the labeled image to a data set for pre-training so that a network learns edge features and color features, modify a classifier according to a coastline patrol and inspection requirement, and perform training on the labeled image so that the network can recognize the coastline and floating garbage.

S400: Adjust a flying direction of the drone for the drone to fly forward along a direction extending tangentially to and forming a direction angle from the coastline, wherein, calculate a mean of all coastline coordinates as a flying starting point of the drone, sort and fit points where the coastline meets land to form a continuous curve, and calculate a tangent direction of a point on the curve, to update the flying direction angle.

The DANet-based drone patrol and inspection method for coastal floating garbage achieves at least the following technical effects: A panoramic segmentation algorithm is used for segmentation to obtain background and foreground target objects in the image, and an independent identity is assigned to each foreground target. A precise segmentation result can be obtained to help a drone adjust flying direction and automatically plan a flying path. In addition, coastal floating garbage is detected, and a location and a class of garbage are fed back once a pollutant is found, to help a relevant department resolve a pollutant patrol and inspection problem in the scenario of a long coastline. The method has advantages of improving the intelligence of patrol and inspection and optimizing a drone route, and can achieve objectives of low cost and high efficiency.

The core panoramic segmentation algorithm of the patrol and inspection system and the patrol and inspection method of the system is a DANet algorithm. According to the algorithm, the RPN network is used to quickly extract a region of interest; target classification and location regression are performed through the foreground branch; and the region proposal attention module and the mask attention module are introduced into the background branch, the feature maps extracted by the RPN and foreground branch are used, and the background segmentation precision is improved. The algorithm can recognize both the target and the background, and correspondingly resolve the problems of floating garbage recognition and coastline recognition. The features extracted by the network each time are used in the three branches, which saves time in contrast to separate extraction.

In terms of data augmentation, the present patent uses partially supervised learning and transfer learning. The partially supervised learning greatly reduces the labeling time, and labels more data in a given time period. By using the transfer learning, coco data sets are used to train network weights and the weights are transferred to their own tasks. With a few data sets, a model that works well can still be obtained through training.

The above is a detailed description of the preferred embodiments of the present disclosure, but the present disclosure is not limited to the above embodiments. Those skilled in the art can make various equivalent variants or replacements without departing from the spirit of the present disclosure. Such variants or replacements are encompassed in the scope defined by the claims of the present application.

We claim:

1. A double attention network (DANet)-based drone patrol and inspection system for coastline floating garbage, comprising:
    an image acquisition module configured to shoot a video of a coastline in need of patrol and inspection by using a drone, and obtain an image from the video;
    a feature extraction module configured to extract shallow features and deep features by inputting the image to an FPN network, fuse the shallow features and the deep features to obtain a shared feature, input the shared feature to each of a region proposal network (RPN) branch, a foreground branch, and a background branch, and finally output a panoramic recognition result;
    a network training module configured to label the image and add the labeled image to a data set for pre-training so that a network learns edge features and color features, modify a classifier according to a coastline patrol and inspection requirement, and perform training on the labeled image so that the network can recognize the coastline and floating garbage; and
    a path correction module configured to adjust a flying direction of the drone for the drone to fly forward along a direction extending tangentially to and forming a direction angle from the coastline, wherein, calculate a mean of all coastline coordinates as a flying starting point of the drone, sort and fit points where the coastline meets land to form a continuous curve, and calculate a tangent direction of a point on the curve, to update the flying direction angle.

2. The DANet-based drone patrol and inspection system for coastline floating garbage according to claim 1, wherein the image acquisition module obtains five frames of images per second from the video, and the image's resolution is 1920*1080.

3. The DANet-based drone patrol and inspection system for coastline floating garbage according to claim 1, wherein when the shared feature is input to the RPN branch, each region proposal with a probability to be a target in the image is calculated based on the shared feature via the RPN, the region proposals are input to a fully connected layer one by one, a class of each region proposal is output through calculation by using a softmax function, and location coordinates of the target in the image are calculated through regional regression.

4. The DANet-based drone patrol and inspection system for coastline floating garbage according to claim 1, wherein when the shared feature is input to the foreground branch for segmentation to obtain a foreground target, ROI Align algorithm is applied on the shared feature to perform bilinear interpolation on a plurality of region proposals, and then pooling is performed to obtain 14×14 and 7×7 feature maps, wherein the 14×14 feature map is input to a mask generation network which is formed by connecting a residual network ResNet50 to two fully connected layers to output a feature map with a mask and obtain a foreground target mask; and the 7×7 feature map is input to a classification and positioning network which is formed by connecting two connection layers to a regression algorithm and a softmax algorithm to obtain and output a class of the foreground target and location coordinates of the foreground target in the image.

5. The DANet-based drone patrol and inspection system for coastline floating garbage according to claim 1, wherein when the shared feature is input to the background branch for segmentation to obtain background of the image, a region proposal attention module and a mask attention module are used, the region proposal attention module is first used for the shared feature and an RPN, corresponding elements are multiplied for the feature, and then are added to original feature elements, and the mask attention module fuses a foreground feature map and a background feature map, and optimizes a background feature by using foreground information.

6. The DANet-based drone patrol and inspection system for coastline floating garbage according to claim 1, wherein the network training module labels the coastline image by using strong and weak labels, and performs pre-training by using coco2014 and coco2015 data sets so that the network learns the edge features and the color features, the network parameters are used for further training, in a process of performing training using the data sets, a pre-trained classifier is discarded first, a network structure and parameter of a previous hidden layer are retained, for different class quantities, the classifier needs to be modified according to the coastline patrol and inspection requirement, so that a quantity of output classes is the same as that of classes that actually need to be detected, the parameter is randomly initialized after the output of the classifier is modified, and then the labeled coastline image is used for training, so that the trained network can recognize the coastline and floating garbage.

7. The DANet-based drone patrol and inspection system for coastline floating garbage according to claim 1, wherein an image instance segmentation algorithm and a flying direction algorithm are built in the drone, the image instance segmentation algorithm recognizes a seawater region, obtains all x and y axis coordinates of seawater in an image, and stores the coordinates in a two-dimensional array, coordinates with a minimum x axis coordinate for each y axis coordinate are selected as coastline coordinates, a mean of all coastline coordinates are calculated as the flying starting point of the drone, the flying direction angle is updated according to the flying direction algorithm, and the drone rotates to adjust to a proper angle.

8. The DANet-based drone patrol and inspection system for coastline floating garbage according to claim 7, wherein the drone uses all the coastline coordinates $[\{P_{1x}, P_{1y}\}, \{P_{2x}, P_{2y}\}, \ldots \{P_{nx}, P_{ny}\}]$ as inputs, the coordinates are sorted by sums of squares of pixel coordinates x and y, a Euclidean distance is calculated between two points and then sort the calculated distance, a group P of adjacent and continuous coastline coordinates are obtained, fit coordinate points of P to obtain the curve, and obtains an offset angle α by using the following formula:

$$\alpha = 90° - \text{Arctan}(k)$$

where k is a slope of the tangent line of a midpoint of the curve, and is used to adjust the flying direction of the drone.

9. The DANet-based drone patrol and inspection system for coastline floating garbage according to claim 1, further comprising a terminal control module configured to remotely control the drone, wherein the terminal control module comprises an information display unit, a drone management unit, and an information management unit.

10. A double attention network (DANet)-based drone patrol and inspection method for coastline floating garbage, comprising:
    shooting a video of a coastline in need of patrol and inspection by using a drone, and obtaining an image from the video;

extracting shallow features and deep features by inputting the image to an FPN network, integrating the shallow features and the deep features to obtain a shared feature, inputting the shared feature to each of an RPN branch, a foreground branch, and a background branch, and finally output a panoramic recognition result;

labeling the image and adding the labeled image to a data set for pre-training so that a network learns edge features and color features, modifying a classifier according to a coastline patrol and inspection requirement, and training the labeled image so that the network can recognize the coastline and floating garbage; and adjusting a flying direction of the drone for the drone to fly forward along a direction extending tangentially to and forming a direction angle from the coastline, calculating a mean of all coastline coordinates as a flying starting point of the drone, sort and fit points where the coastline meets land to form a continuous curve, and calculate a tangent direction of a point on the curve, to update the flying direction angle.

* * * * *